United States Patent [19]

Ito et al.

[11] Patent Number: 5,133,230
[45] Date of Patent: Jul. 28, 1992

[54] AUTOMATIC TRANSMISSION OF ELECTRONIC CONTROL TYPE

[75] Inventors: Yasunobu Ito, Okazaki; Yasuo Mizuno, Chiryu, both of Japan

[73] Assignee: Aisin AW Co., Ltd., Japan

[21] Appl. No.: 633,342

[22] Filed: Dec. 27, 1990

[30] Foreign Application Priority Data

Dec. 29, 1989 [JP] Japan .................................. 1-342174

[51] Int. Cl.$^5$ .............................................. B60K 41/08
[52] U.S. Cl. ...................................................... 74/866
[58] Field of Search ........................................... 74/866

[56] References Cited

U.S. PATENT DOCUMENTS

| | | | |
|---|---|---|---|
| 4,685,356 | 8/1987 | Iwatsuki | 74/866 |
| 4,707,789 | 11/1987 | Dowas et al. | 74/866 X |
| 4,748,870 | 6/1988 | Sugino et al. | 74/866 |
| 4,838,126 | 6/1989 | Wilfinger et al. | 74/866 |
| 4,855,913 | 8/1989 | Brekkestran et al. | 74/866 X |

Primary Examiner—Leslie A. Braun
Assistant Examiner—Ryan W. Massey
Attorney, Agent, or Firm—Lorusso & Loud

[57] ABSTRACT

Herein disclosed is an automatic transmission of electronic control type, which has hydraulic control for improving the shift feel of the automatic transmission. This automatic transmission includes an oil pressure source; a line pressure regulating valve for regulating the output oil pressure of the oil pressure a source to a line pressure; line pressure controller for sending an oil pressure signal for changing the line pressure to the line pressure regulating valve in response to an electric signal; an r.p.m. sensor for detecting the start and end of a shift; and an electronic controller for changing the electric signal to the line pressure controller stepwise in an open loop in a manner to correspond to the divisions of the shift which include at least starting, ending and intermediate stages.

4 Claims, 11 Drawing Sheets

| Position | | Solenoid | | | Clutch | | | Brake | | | | O.W.C. | | |
|---|---|---|---|---|---|---|---|---|---|---|---|---|---|---|
| | | №1 | №2 | №4 | C1 | C2 | C3 | B1 | B2 | B3 | B4 | F1 | F2 | F3 |
| P | | × | ○ | | | | | | | | ○ | | | |
| R | V≧7 | × | ○ | | | ○ | | | ○ | | ○ | | | |
| | V<7 | ○ | ○ | | | ○ | | | × | | ○ | | | |
| N | | × | ○ | | | | | | | | ○ | | | |
| D | 1ST | × | ○ | | ○ | | | | | | ○ | | ○ | ○ |
| | 2ND | ○ | ○ | ○ | ○ | | | ○ | ○ | | ○ | | ○ | ○ |
| | 3RD | ○ | × | ○ | ○ | ○ | | ○ | ○ | | | | ○ | ○ |
| | 4TH | × | × | ○ | | ○ | ○ | | | | | | | |
| 3 | 1ST | × | ○ | | ○ | | | | | | ○ | | ○ | ○ |
| | 2ND | ○ | ○ | ○ | ○ | | | ○ | ○ | | ○ | | ○ | ○ |
| | 3RD | ○ | × | ○ | ○ | ○ | | ○ | ○ | | | | ○ | ○ |
| | (3RD) | × | × | | ○ | ○ | | ○ | ○ | | | | ○ | ○ |
| 2 | 1ST | × | ○ | | ○ | | | | | | ○ | | ○ | ○ |
| | 2ND | ○ | ○ | ○ | ○ | | | ○ | ○ | | ○ | | ○ | ○ |
| | (3RD) | ○ | × | | ○ | ○ | | ○ | ○ | | | | ○ | ○ |
| | (3RD) | × | × | | ○ | ○ | | ○ | ○ | | | | ○ | ○ |
| | 1ST | × | ○ | | ○ | | | | | ○ | ○ | | ○ | ○ |
| | 2ND | ○ | ○ | | ○ | | | ○ | ○ | ○ | ○ | | ○ | ○ |
| | (1ST) | × | × | | ○ | | | | | ○ | ○ | | ○ | ○ |
| Remarks | | ○ | ON | | engage | | | | | | | | | |
| | | × | OFF | | Release | | | | | | | | | |

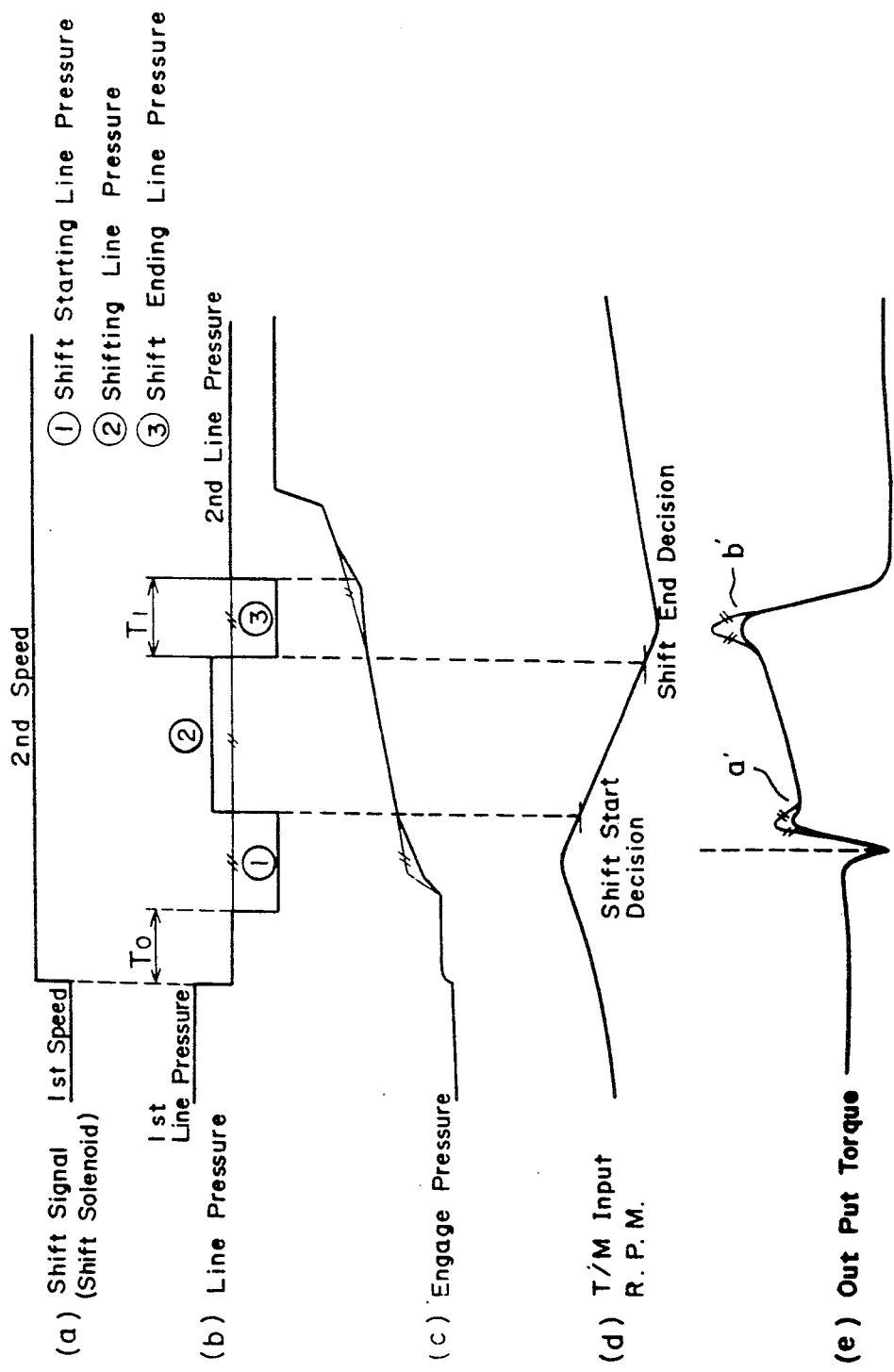

| Shift to<br>Throttle<br>Opening | 2rd | | 3rd | | 4th | |
|---|---|---|---|---|---|---|
| | (A) | (B) | (A) | (B) | (A) | (B) |
| Idle | D1 | D11 | D21 | D31 | D41 | D51 |
| θ0 | D2 | D12 | D22 | D32 | D42 | D52 |
| θ1 | D3 | D13 | D23 | D33 | D43 | D53 |
| θ2 | D4 | D14 | D24 | D34 | D44 | D54 |
| θ3 | D5 | D15 | D25 | D35 | D45 | D55 |
| θ4 | D6 | D16 | D26 | D36 | D46 | D56 |
| θ5 | D7 | D17 | D27 | D37 | D47 | D57 |
| θ6 | D8 | D18 | D28 | D38 | D48 | D58 |
| θ7 | D9 | D19 | D29 | D39 | D49 | D59 |
| Kick-Down | D10 | D20 | D30 | D40 | D50 | D60 |

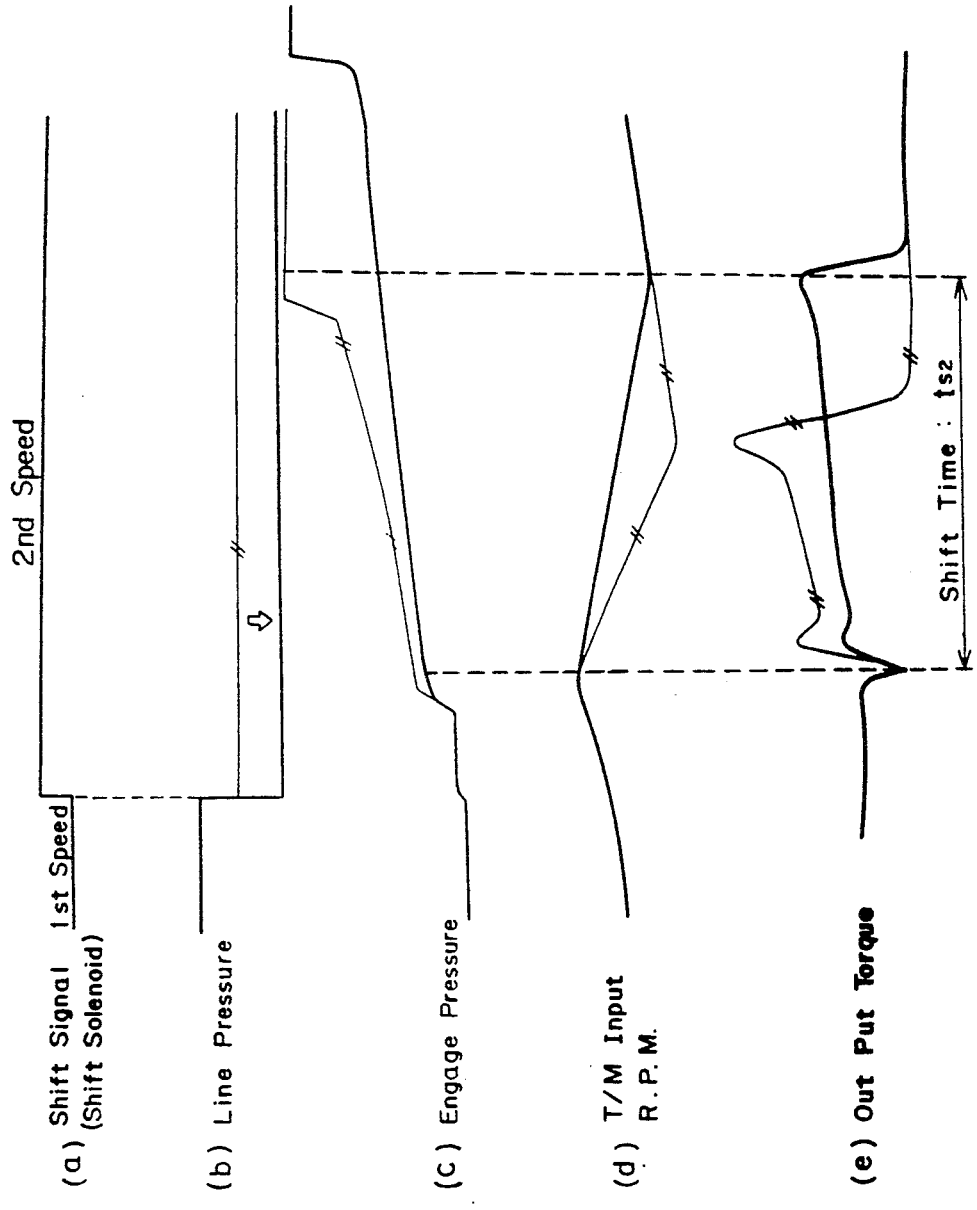

AUTOMATIC TRANSMISSION OF ELECTRONIC CONTROL TYPE

BACKGROUND OF THE INVENTION

1. Field of the Invention

The present invention relates to an automatic transmission of electric control type and, more particularly, to the hydraulic control of a hydraulic control system for improving the shift feel of the automatic transmission at the time of a shift.

2. Description of the Prior Art

In the automatic transmission of the prior art, the line pressure, i.e., the oil pressure to be fed to shifting components of the transmission such as clutches or brakes is set according to the throttle opening, the gear ratio and the vehicle speed.

Since, however, the oil pressure during a shift is at a constant level, it is difficult to improve the shift feel.

FIG. 10 is a diagram showing the shifting characteristics of an example in which the oil pressure is set to control the shift feel as well as possible while retaining the durability of the engage components of the prior art.

As indicated at (a) in FIG. 10, the electronic control means decides an upshift from the 1st to 2nd speeds according to the input conditions including the throttle opening and the vehicle speed and switches a signal to the shift solenoid from the 1st to 2nd speeds so as to effect the upshift. Simultaneously with this, as indicated at (b) in FIG. 10, the line pressure of the transmission (T/M) is switched from that for the 1st speed to that for the 2nd speed. Moreover, the engage pressure is also raised, as indicated at (c) in FIG. 10, to start the shift, and the T/M input r.p.m. (=the engine r.p.m.) drops from the shift starting point and rises at the shift end, as indicated at (d) in FIG. 10. On the other hand, the output shaft torque during the shift changes, as indicated at (e) in FIG. 10. What invites trouble here is the torque fluctuations a and b which occur at the shift starting point (i.e., the engage starting point of the engage components) and the shift ending point which detract from the feel of the shift.

In order to reduce the aforementioned torque fluctuations, therefore, it is generally known to drop the oil pressure to be applied to the engage components, as will be exemplified in the following.

FIG. 11 is a diagram of the shifting characteristics showing an example in which the set oil pressure is dropped to improve the shift feel.

As indicated at (b) in FIG. 11, similar to FIG. 10, the line pressure is dropped from the aforementioned line pressure for the 2nd speed (that is, the engage pressure slowly changes, as indicated at (c) in FIG. 11, and the T/M input r.p.m. changes, as indicated at (d) in FIG. 11). Then, the fluctuations of the output shaft torque at the shift starting/ending points are reduced to improve the shift feel. As indicated at (e) in FIG. 11, however, shift time $t_{m2}$ is seriously lengthened. This means that the slip time of the engage components such as the clutches or brakes is prolonged to the detriment of the durability of the engagement components.

SUMMARY OF THE INVENTION

The present invention has an object to provide an automatic transmission of electronic control type, which eliminates the above-specified problems and improve the shift feel without deterioration of the durability of the clutches or brakes.

In order to achieve the above-specified object, according to the present invention, there is provided an automatic transmission of electronic control type, which comprises: an oil pressure source; a line pressure regulating valve for regulating the output oil pressure of said oil pressure source to a line pressure; line pressure control means for sending an oil pressure signal for changing the line pressure to said line pressure regulating valve in response to an electric signal; an r.p.m. sensor for detecting the start and end of a shift; and means for changing the electric signal to said line pressure control means stepwise, in an open loop, in a manner to correspond to said divisions of the shift, which include at least starting, ending and intermediate stages.

With the structure thus far described, according to the present invention, a fine hydraulic control can be accomplished by controlling the hydraulic control solenoid in accordance with the shifting situations of the automatic transmission, after the shift signal has been outputted, to change the oil pressure in multiple stages.

BRIEF DESCRIPTION OF THE DRAWINGS

Other objects, features and advantages of the present invention will become apparent from the following description to be made with reference to the accompanying drawings, in which:

FIG. 5 is a diagram showing the shifting characteristics of the automatic transmission of electronic control type;

FIGS. 10 and 11 are diagrams showing the shifting characteristics of the prior art.

DESCRIPTION OF THE PREFERRED EMBODIMENTS

The present invention will be described in detail in connection with the embodiment thereof with reference to the accompanying drawings.

Figure 1:
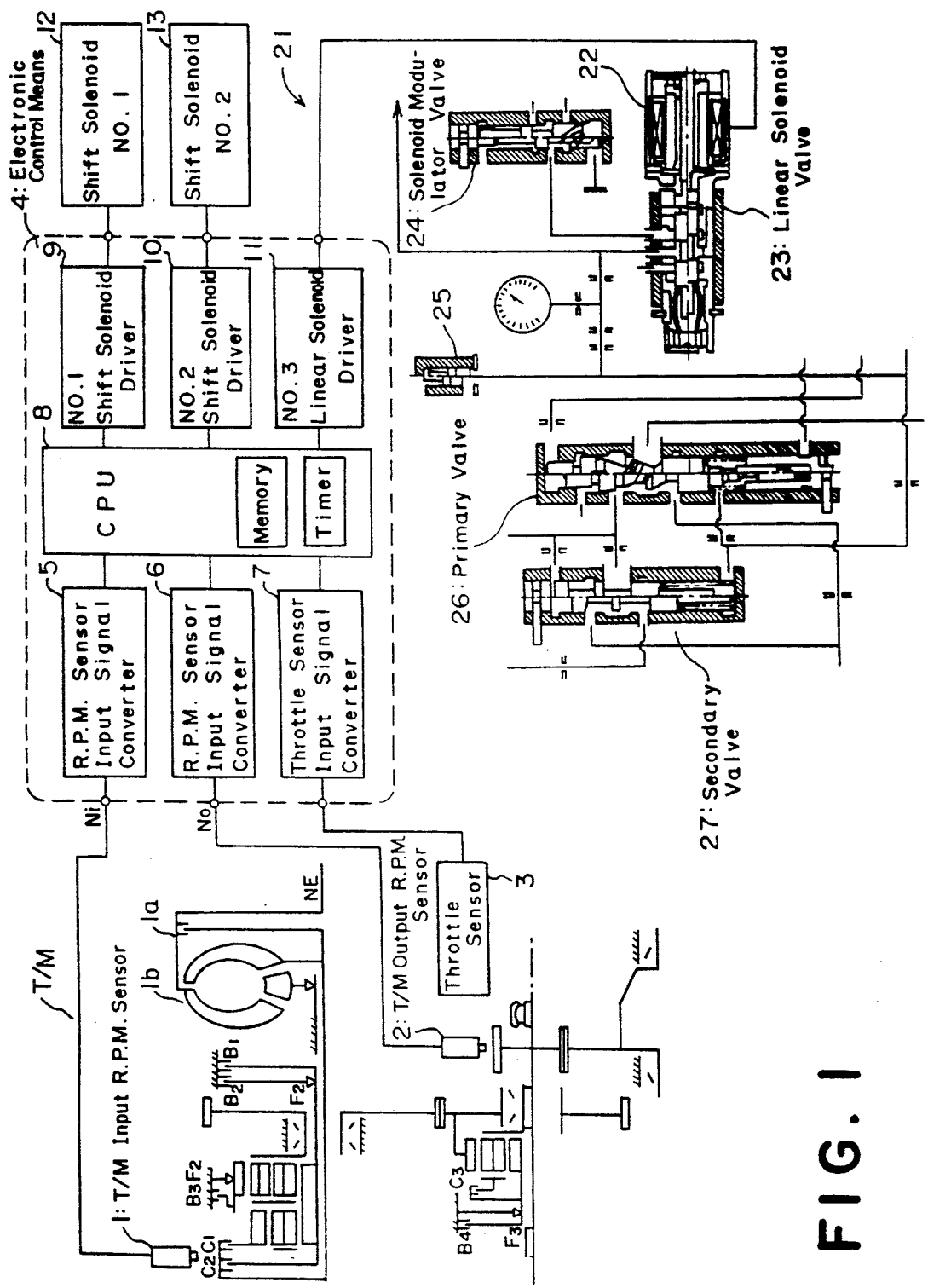
FIG. 1 is a diagram showing the overall system structure of an automatic transmission of electronic control type according to an embodiment of the present invention.

As shown in FIG. 1, reference numeral 1 designates a T/M input r.p.m. sensor; numeral 2 a T/M output r.p.m. sensor; numeral 3 a throttle position sensor (as will be shortly referred to as the "throttle sensor"); numeral 4 electronic control means acting as control means; numeral 5 an r.p.m. sensor input signal converter connected with the T/M input r.p.m. sensor 1; numeral 6 an r.p.m. sensor input signal converter connected with the T/M output r.p.m. sensor 2; numeral 7 a throttle sensor input signal converter connected with the throttle sensor 3; numeral 8 a CPU housing a memory and a timer; numeral 9 a first shift solenoid driver; numeral 10 a second shift solenoid driver; and numeral 11 a linear solenoid driver.

Figure 2A:
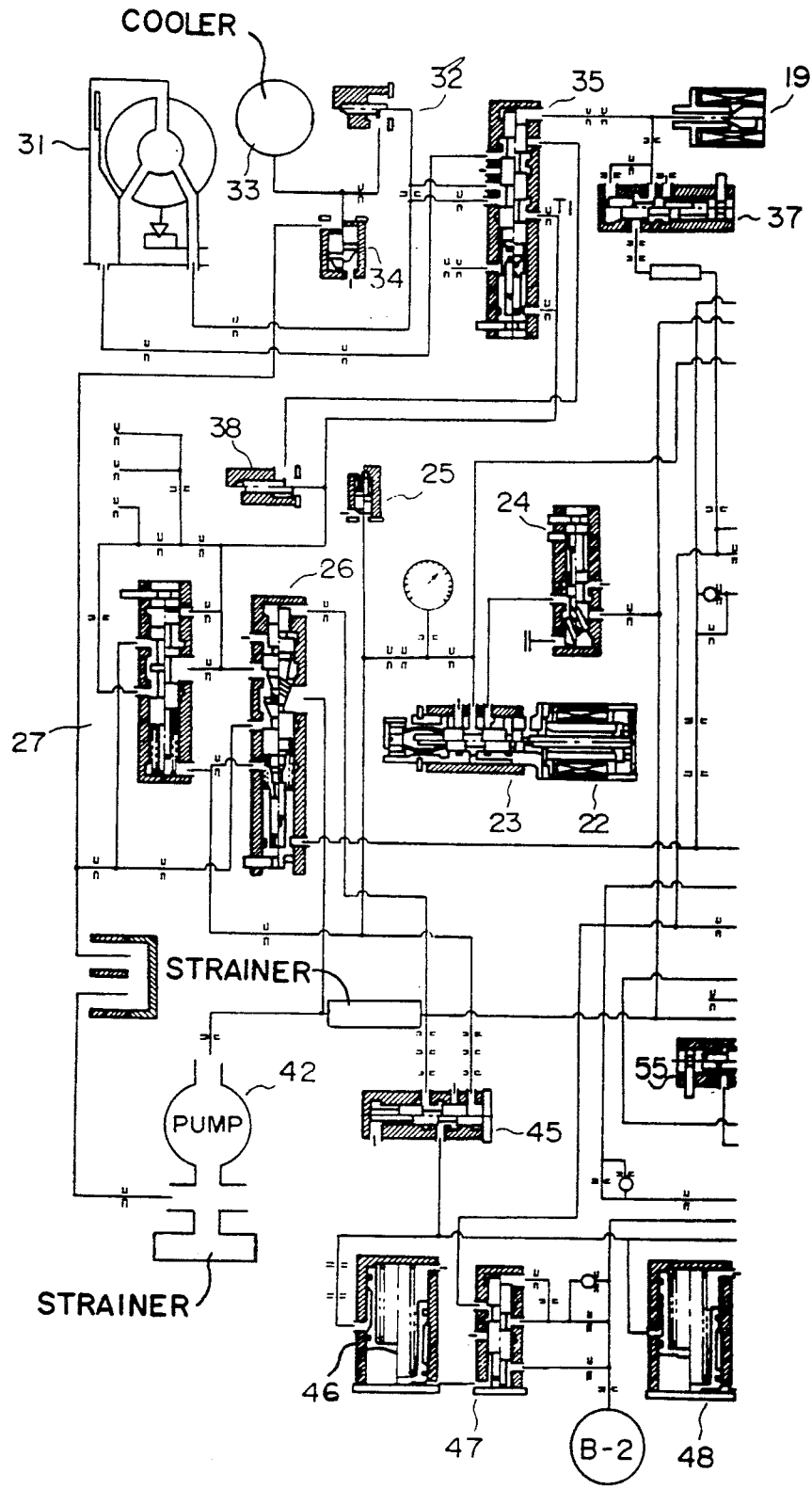
FIG. 2(a) and 2(b) are a diagram showing the hydraulic circuit of the automatic transmission of electronic control type.
Figure 2B:
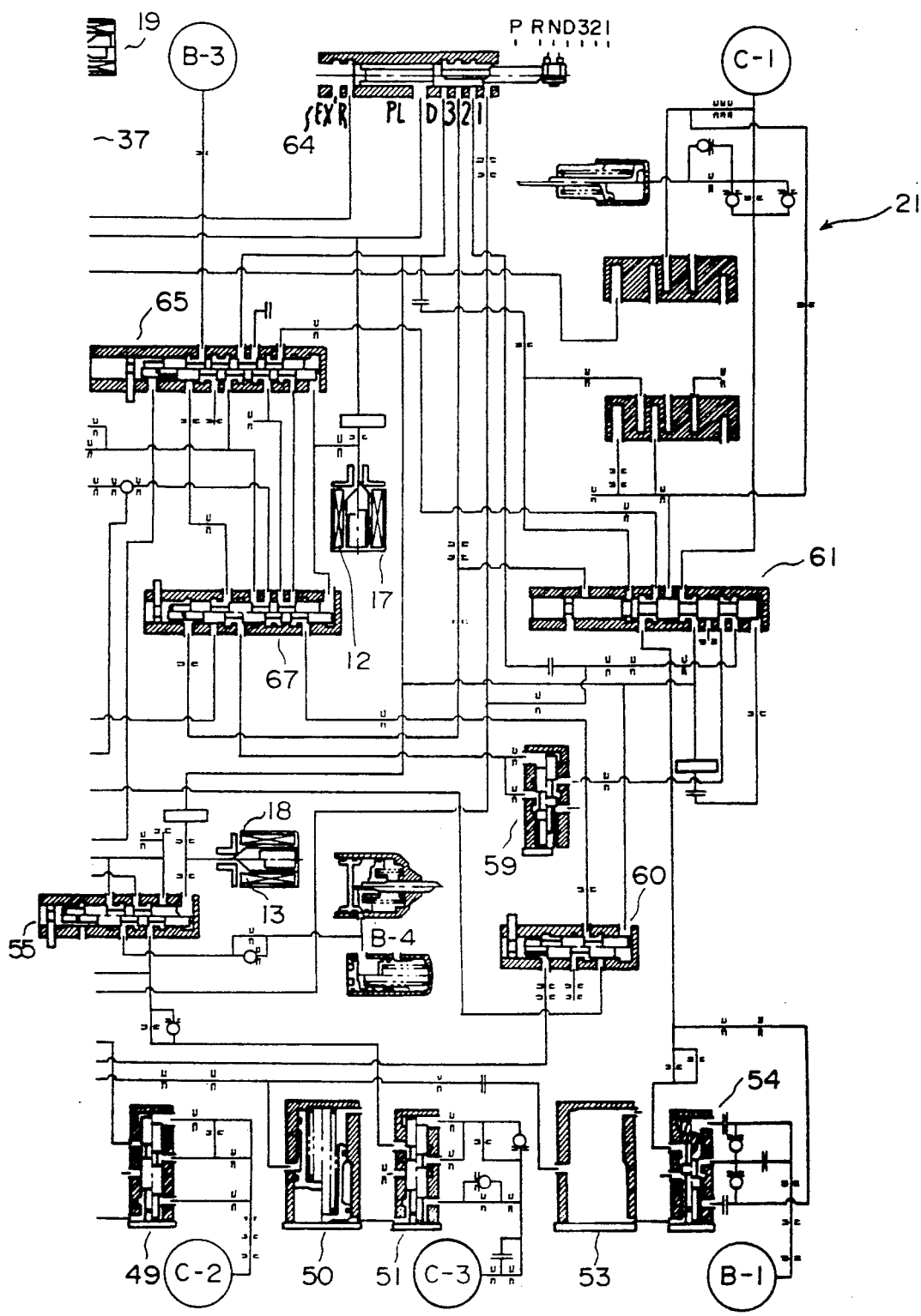

As shown in FIG. 2, moreover, a hydraulic circuit is composed of a torque converter 31, check valves 32 and 38, a cooler 33, a cooler bypass valve 34, a lockup control valve 35, a lockup solenoid (i.e., a fourth solenoid) 19, a lockup modulator valve 37, a secondary valve 27, a primary valve 26, a pressure relief valve 25, an oil pump 42, a solenoid modulator valve 24, a linear solenoid valve 23, an accumulator control valve 45, $B_2$ accumulators 46 and 47, $C_2$ accumulators 48 and 49, $C_3$ accumulators 50 and 51, $B_1$ accumulators 53 and 54, a 2-3 shift valve 55, a second solenoid valve 18 having a second shift solenoid 13, a low modulator valve 59, a $B_1$ sequence valve 60, a neutral control valve 61, a manual valve 64, a 1-2 shift valve 65, a first solenoid valve 17 having a first shift solenoid 12, and a 3-4 shift valve 67.

Figures 3, 4:
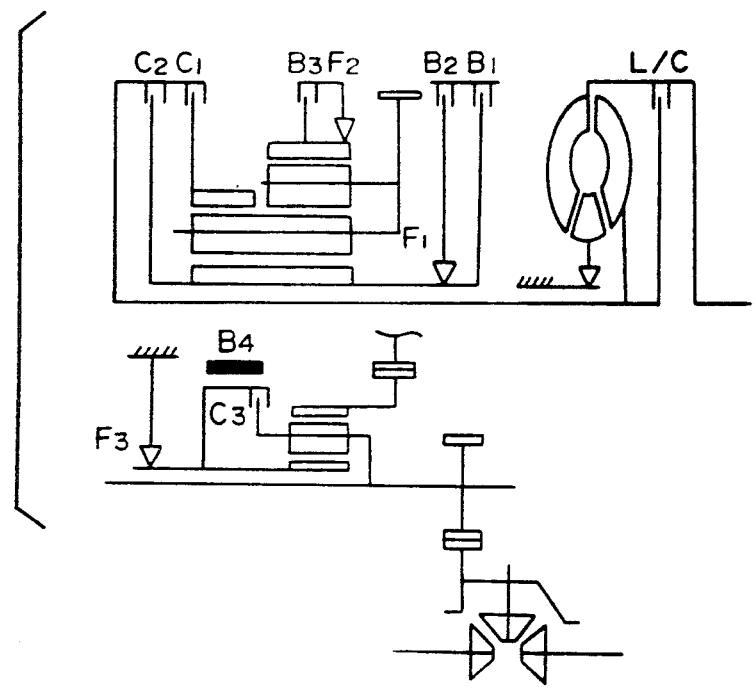
FIG. 3 is a schematic diagram showing the automatic transmission of electronic control type.
FIG. 4 is a table showing the operations of the automatic transmission.

Thus, the automatic transmission of the present invention has the shift mechanism shown in FIG. 3 and operates, as shown in FIG. 4.

Here will be described the hydraulic circuit to which a line pressure control linear solenoid 22 relates, as shown in FIG. 1. The hydraulic circuit is composed of: a clutch and brake hydraulic servo mechanism (although not shown) for engaging or releasing the predetermined components of the shift gear mechanism; and the primary valve 26 for regulating the line pressure to be fed to the hydraulic servo mechanism thereby to provide communication with control pressure coming from the linear solenoid valve 23. In response to the signal coming from a linear solenoid driver 11, the linear solenoid 22 of the linear solenoid valve 23 operates the primary valve 26 in response to the line pressure data to control the oil pressure to be fed to the predetermined components.

Figures 7, 8:
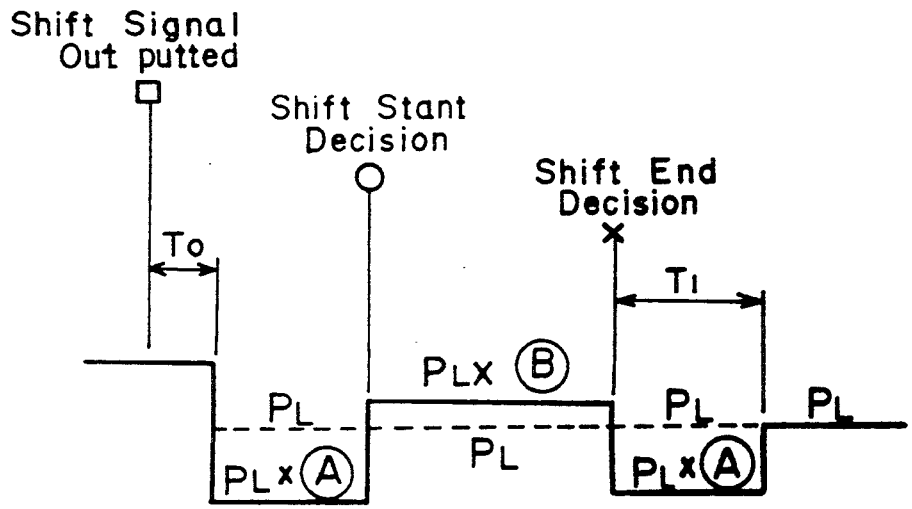
FIG. 7 is a time chart showing the line pressure control.
FIG. 8 is a table of the stored data of the gear stages against the throttle opening of the present invention.

FIG. 7 is a time chart showing an example of such line pressure control, and FIG. 8 is a table of the stored data of the gear stages against the throttle opening, which are to be stored in a memory.

In FIG. 8, data (A) and (B) are composed of and stored in 1 byte by dividing 0 to 150% into 16 steps. As shown in FIG. 7, moreover, the oil pressure can be finely set according to the shift situations, after the shift signal has been outputted, by multiplying a reference oil pressure $P_L$ by increments of 0 to 150%.

The oil pressure control in the automatic transmission of electronic control type of the present invention will be described in the following by exemplifying an upshift from the 1st to 2nd speeds as the shifting characteristics.

As indicated at (a) in FIG. 5, the electronic control means 4 (as shown in FIG. 1) decides the upshift from the 1st to 2nd speeds on the basis of the data of the throttle opening and the vehicle speed and switches the signal to the shift solenoids from the 1st speed to the 2nd speed so as to effect the upshift. Simultaneously with this, the line pressure is switched from the 1st to 2nd speeds, as indicated at (b) in FIG. 5. After $T_o$ seconds from this switching, the line pressure is dropped to ① (i.e., the shift starting line pressure) so as to reduce the shock at the time of starting the shift. This line pressure ① is held till the shift start is decided in terms of the T/M input r.p.m., as indicated at (c) in FIG. 5.

Here, the time $T_o$ is used to prevent the time period from being elongated from the output of the shift signal to the start of the shift and is set at $T_o=0$ seconds, unless otherwise especially necessary.

Next, in order to shorten the shift time from the shift start decision to the shift end decision and to retain the durability of the engage components, the line pressure is changed to and held at a higher level ② (i.e., the shifting line pressure higher than the level for the 2nd speed but lower than the level for the 1st speed). In order to reduce the shocks at the end of the shift, moreover, the line pressure is changed to and held at a lower level ③ for a time period $T_1$ (e.g., 1 second) from the shift end decision. After the $T_1$ seconds from the shift end decision, moreover, the line pressure is changed to the level for the 2nd speed. At this time, the T/M input r.p.m. and the oil pressure to be fed to the engage components are so changed, as indicated at (d) and (e) in FIG. 5. Specifically, the fluctuations of the output torque, which are generated at the shift starting point and the shift ending point, are rounded, as indicated at a' and b', so that the shift shocks can be reduced.

Thus, after the switching of the shift signal, three kinds of oil pressures are newly set as those for the shift so that the oil pressure control solenoids are controlled. As a result, the oil pressure control can be finely accomplished to improve the shift feel without diminishing the durability of the engage components.

Here, the shift start decision and the shift end decision of the present invention are executed on the basis of the gear ratios before and after the shift and the r.p.m. coming from the T/M output r.p.m. sensor when the r.p.m. obtained from the T/M input r.p.m. sensor reaches the following calculated values:

Shift Start Decision: $Nis \leq K_1 \times i_1 \times N_o$;

and

Shift End Decision: $Nie \leq K_2 \times i_2 \times N_o$, wherein:
 Ni: T/M Input R.P.M.;
 $K_1$: Constant (e.g., 0.8);
 $i_1$: Gear Ratio before Shift;
 $N_o$: T/M Output R.P.M.;
 $K_2$: Constant (e.g., 1.1); and
 $i_2$: Gear Ratio before Shift.

Figure 6A:
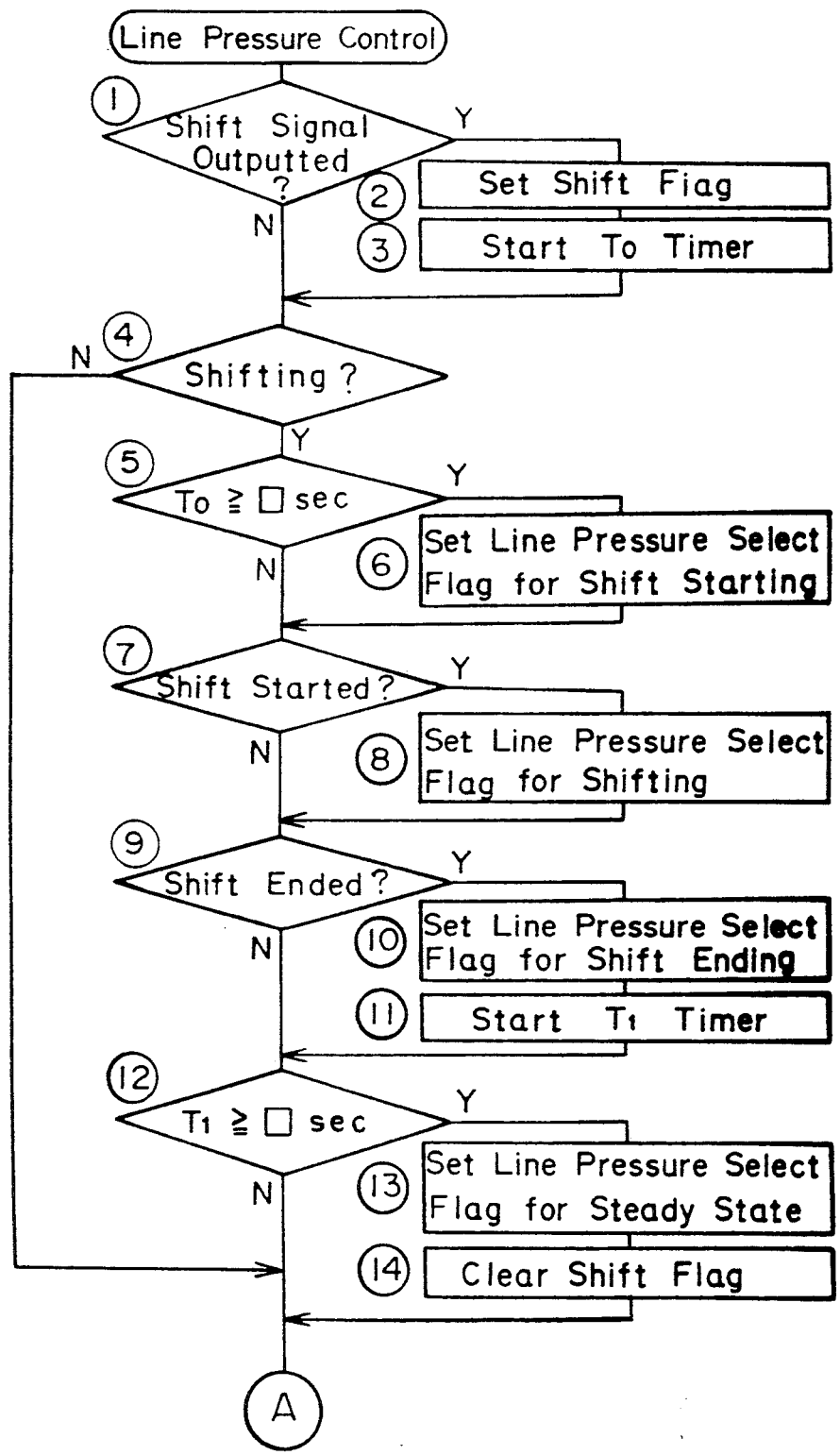
FIGS. 6(a) and 6(b) are a flow charts showing the line pressure control of the present invention.
Figure 6B:
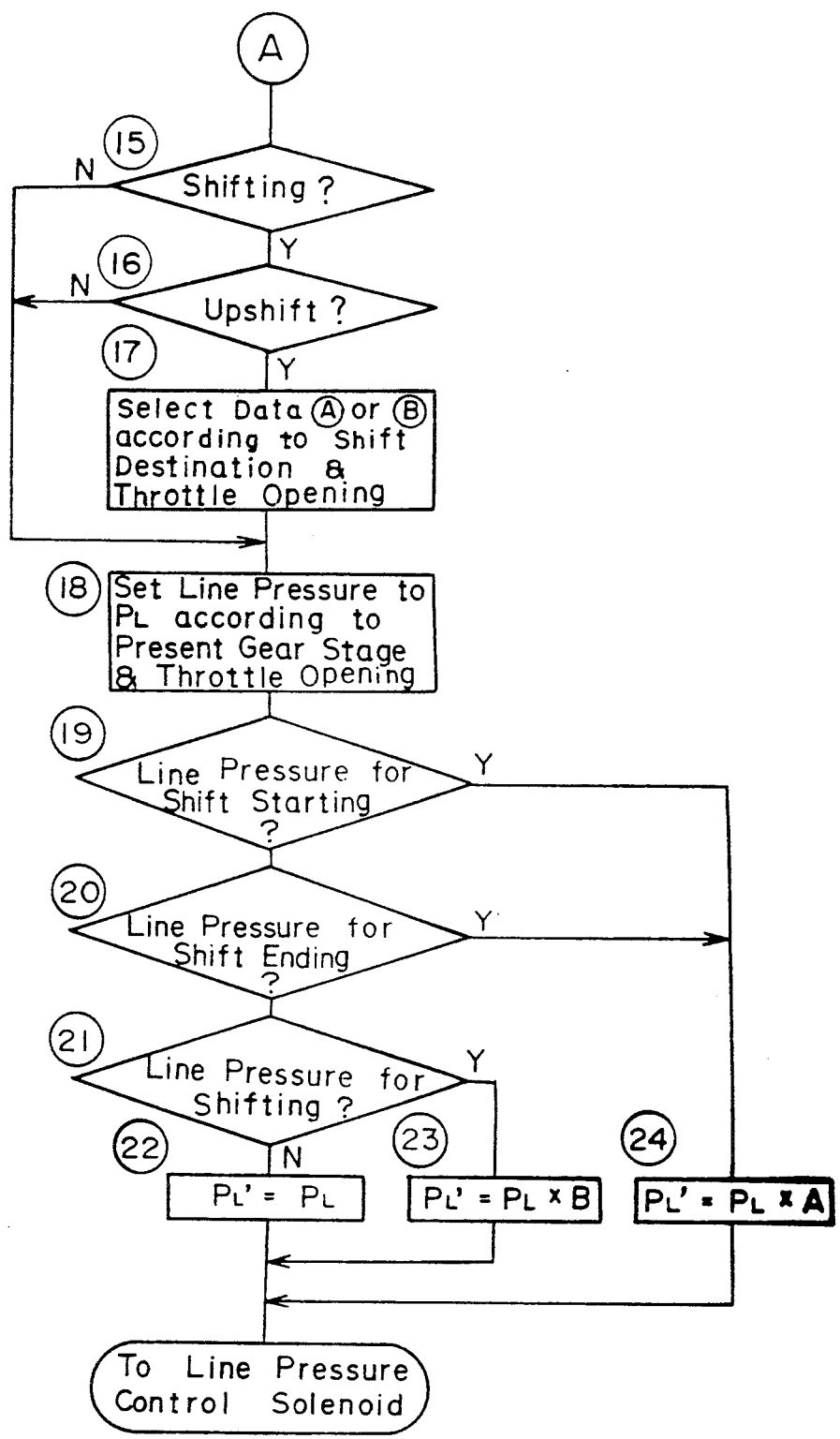

The embodiment of the present invention will be described in the following in connection with the line pressure control flow with reference to FIG. 6.

First of all, it is decided at Step ① whether or not the shift signal has been outputted. If YES, the shift flag is set at Step ②, and the $T_o$ timer is started at Step ③. If NO, namely, if the shift signal is not outputted, it is decided at Step ④ whether or not the automatic transmission is being shifted. If YES, it is decided at Step ⑤ whether or not the time $T_o$ has been elaspsed. If YES, the line pressure select flag is set at Step ⑥ for the shifting. If NO, namely, the time $T_o$ is not elapsed, it is decided at Step ⑦ whether or not the shift is started. If YES, the line pressure select flag is set at Step ⑧ for the shifting. If NOT, namely, if the shift is not started, it is decided at Step ⑨ whether or not the shift has been ended. If YES, the line pressure select flag is set at Step ⑩ for the shift ending, and the $T_1$ timer is started at Step ⑪. If NOT, namely, the shift is not ended, it is decided at Step ⑫ whether or not the time $T_1$ has been elapsed. If YES, the line pressure select flag is set at Step ⑬ for the steady state, and the shift flag is cleared at Step ⑭. If NOT, namely, the time T₁ is not reached, it is decided at Step ⑮ whether or not the transmission is being shifted. If YES, it is decided at Step ⑯ whether or not the shift is the upshift. If YES, either of two kinds of data (A) and (B) is selected at Step ⑰ on the basis of the shift destination and the throttle opening. Next, the line pressure $P_L$ is set at Step ⑱ on the basis of the gear stage at present and the trottle opening. Moreover, it is decided: at step ⑲ whether or not the line pressure is for shift-starting, at Step ⑳ whether or not the line pressure is for ending the shift; and at step ㉑ whether or not the line pressure is for the shifting. In accordance with these decision results, respectively, the line pressures are controlled at Steps ㉒, ㉓ and ㉔ to the individual set levels.

Figure 9:
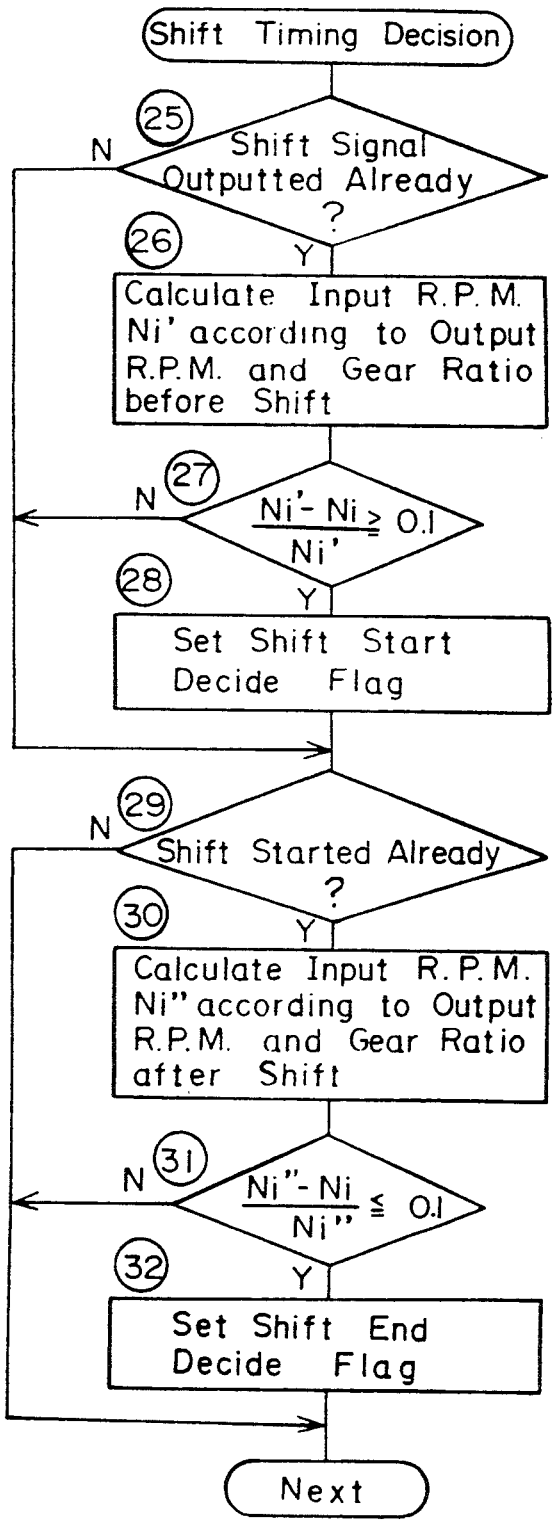
FIG. 9 is a flow chart for deciding the shift timings of the present invention.
Figure 10:
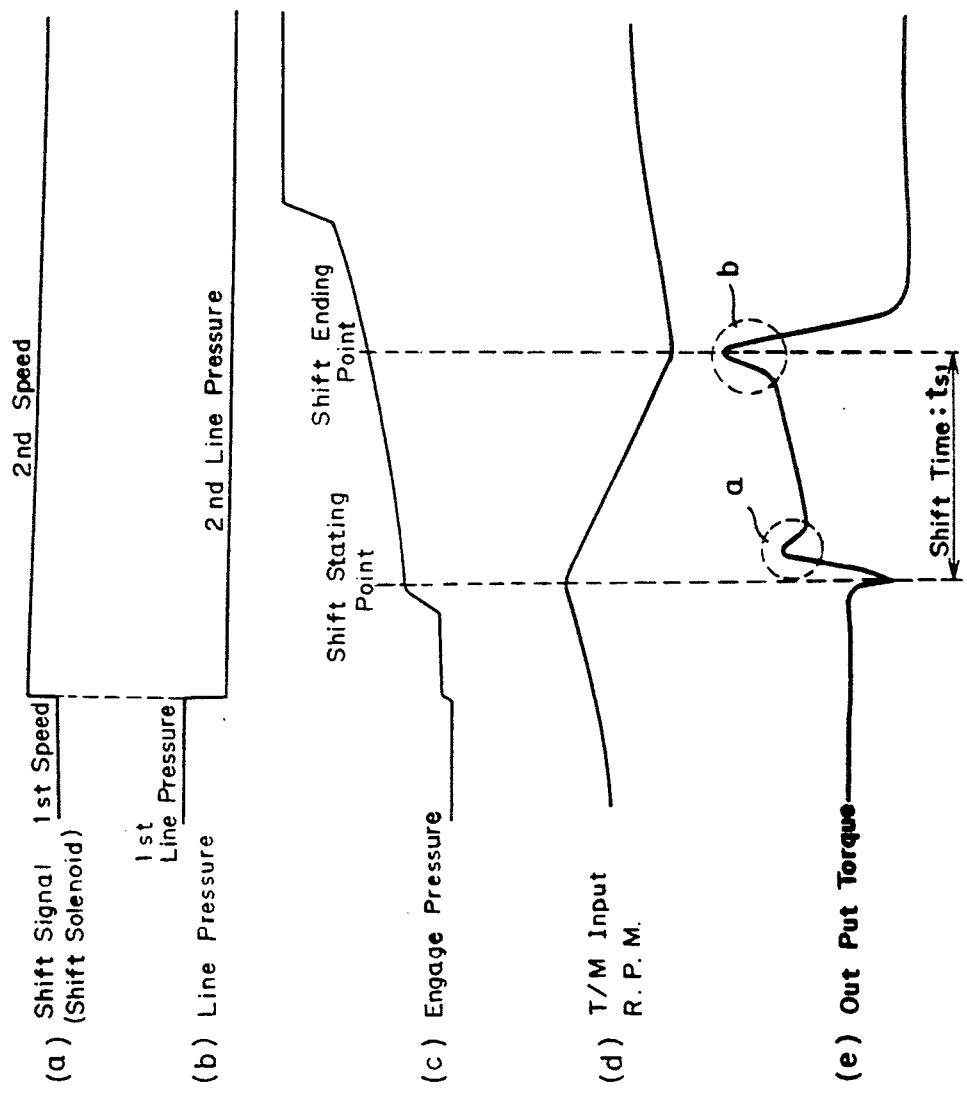

Subsequently, the shift timing decide flow according to the embodiment of the present invention will be described with reference to FIG. 9.

First of all, it is decided at Step ㉕ whether or not the shift signal has been outputted already. If YES, the input r.p.m. Ni' is calculated at Step ㉖ on the basis of the T/M output r.p.m. from the T/M output r.p.m. sensor and the gear ratio before the shift. Next, it is decided at Step ㉗ whether or not (Ni'-Ni)/Ni'≧0.1. If the result is YES, the shift start decision flag is set at Step . Next, it is decided at Step ㉘ whether or not the shift has been started already. If the result is YES, the T/M input r.p.m. Ni" is calculated at Step ㉙ on the basis of the T/M output r.p.m. and the gate ratio after the shift. Next, it is decided at Step ㉚ whether or not (Ni"-Ni)/Ni"≦0.1. If the result is YES, the shift end decision flag is set at Step ㉛.

Incidentally, in the foregoing embodiment, the line pressure control means is exemplified by the linear solenoid which includes: an electromagnet member for generating a pushing force in proportion to the current value supplied; and a valve member having a spool driven by the electromagnet member. Despite this fact, however, the linear solenoid may be replaced by another actuator. This actuator may be a solenoid valve such as a duty solenoid which is enabled to output a signal at an arbitrary oil pressure level by repeating its ON/OFF for a predetermined frequency.

Incidentally, the present invention should not be limited to the embodiment thus far described but can be modified in various manners on the basis of the concept thereof without departing from the gist and scope of the following claims.

What is claimed is:

1. An automatic transmission of electronic control type, comprising:

an oil pressure source;

a line pressure regulating valve for regulating the output oil pressure of said oil pressure source to a line pressure;

line pressure control means for sending an oil pressure signal, for changing the line pressure, to said line pressure regulating valve in response to an electric signal;

an r.p.m. sensor for detecting the start and end of a shift; and means for changing the electric signal to said line pressure control means stepwise in an open loop in a manner to correspond to the divisions of the shift, which divisions include at least starting, ending and intermediate stages;

wherein said r.p.m. sensor comprises a transmission output r.p.m. sensor and a transmission input r.p.m. sensor so that the shift start and end may be decided on the basis of the gear ratios before and after the shift and the r.p.m. of the transmission output r.p.m. sensor, respectively, if the r.p.m. of the transmission input r.p.m. sensor reaches the following calculated values:

Shift Start Decision: $Nis \leq k1 \times i1 \times No$ and

Shift End Decision: $Nie \leq k2 \times i2 \times No$ wherein:
Ni: Transmission Input R.P.M.;
k1: Constant (e.g. 0.8);
i1: Gear Ratio before Shift;
No: Transmission Output R.P.M.;
k2: Constant (e.g. 1.1);
i2: Gear Ratio after Shift.

2. An automatic transmission according to claim 1, wherein said line pressure control means comprises: a linear solenoid including: an electromagnet member for generating a pushing force in proportion to the current value supplied; and a value member having a spool driven by said electromagnet member.

3. An automatic transmission according to claim 2 wherein said transmission includes an input shaft and wherein said transmission input r.p.m. sensor detects rotation of said input shaft.

4. An automatic transmission according to claim 1 wherein said transmission includes an input shaft and wherein said transmission input r.p.m. sensor detects rotation of said input shaft.

* * * * *

UNITED STATES PATENT AND TRADEMARK OFFICE
CERTIFICATE OF CORRECTION

PATENT NO. : 5,133,230

DATED : July 28, 1992

INVENTOR(S) : ITO et al

It is certified that error appears in the above-identified patent and that said Letters Patent is hereby corrected as shown below:

Col. 6, line 42, "value member" should read --valve member--.

Signed and Sealed this

Twenty-eighth Day of September, 1993

Attest:

BRUCE LEHMAN

*Attesting Officer*  *Commissioner of Patents and Trademarks*